(No Model.)
J. L. SUESSEROTT.
VETERINARY TABLE.
No. 259,242. Patented June 6, 1882.
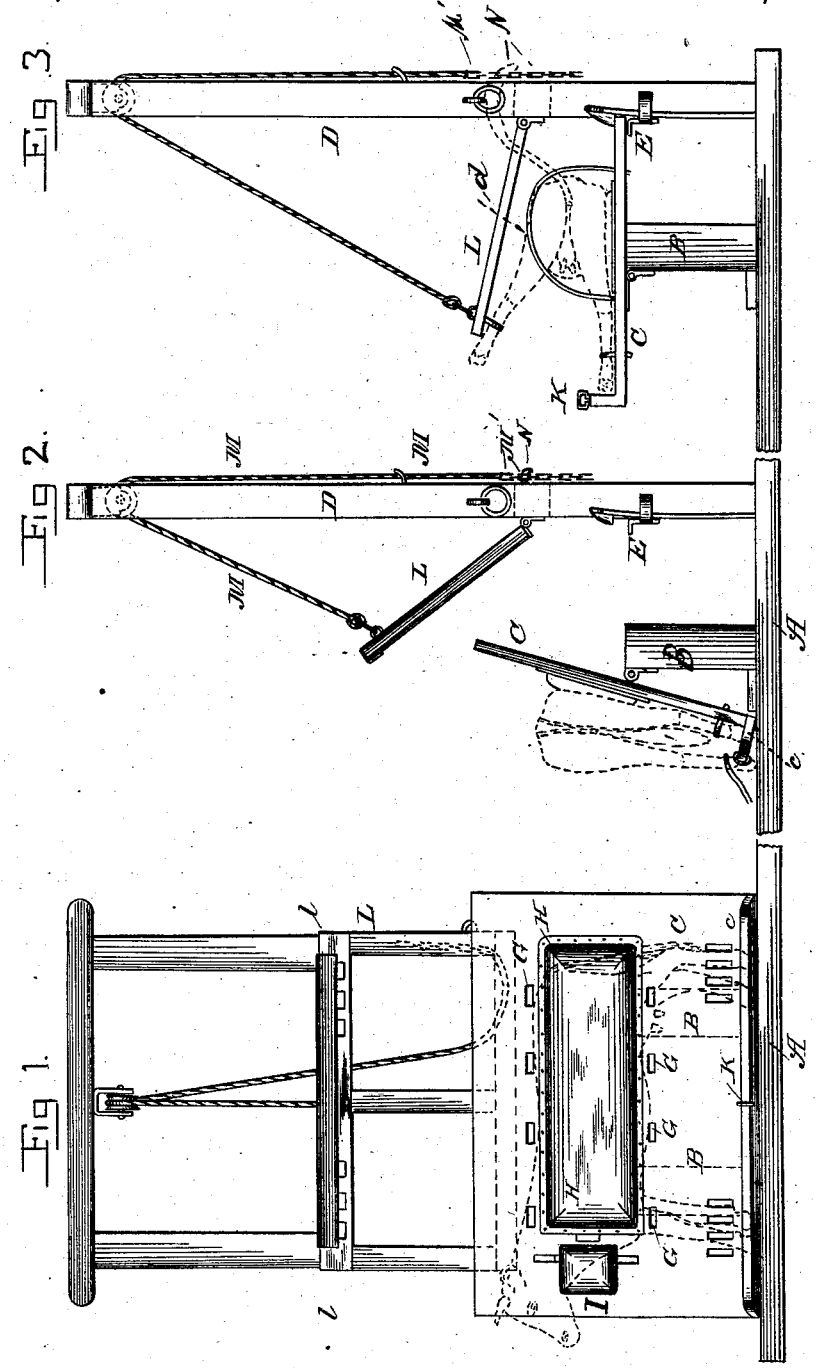
WITNESSES:
Fred. G. Dieterich.
W. E. Bowen.
INVENTOR.
J. L. Suesserott
By Daniel Breed ATTORNEYS.

UNITED STATES PATENT OFFICE.

JACOB L. SUESSEROTT, OF CHAMBERSBURG, PENNSYLVANIA.

VETERINARY TABLE.

SPECIFICATION forming part of Letters Patent No. 259,242, dated June 6, 1882.

Application filed March 9, 1882. (No model.)

*To all whom it may concern:*

Be it known that I, JACOB L. SUESSEROTT, a citizen of the United States, residing at Chambersburg, in the county of Franklin and State of Pennsylvania, have invented certain new and useful improvements in veterinary surgical operating-tables or animal-stocks for casting and holding animals, of which the following is a specification, reference being had therein to the accompanying drawings.

My invention consists of certain improvements in veterinary surgical tables or animal-stocks, which will be fully understood by the following description and claims.

In the accompanying drawings, Figure 1 represents a front view of my veterinary surgical operating-table or animal-stock. Fig. 2 is an end view with the table tilted vertically in order to lash the animal thereto. Fig. 3 is also an end view with the animal raised on the table ready for the operation.

The object of my invention is to cast and hold an animal while a surgeon performs an operation upon him.

Upon a suitable platform, A, or otherwise firmly fixed, are two pedestals, B, to which the table C is hinged at or near its longitudinal center, so as to be easily tilted laterally into either a vertical or horizontal position, as shown in the drawings. The posts D are provided with stops E for supporting the edge of the table when in a horizontal position, where it is fastened by a spring-catch, E. This table has a series of holes, G, for passing belts for lashing the heifer or other animal to the table, which lashing is done while the animal is in a standing position, and the table tilted vertically, as seen in Fig. 2, the animal having one fore and one hind foot on the ledge c of the table. The table is also provided with a cushion, H, and a second or head cushion, I, with holes for the halter in fastening the head of the animal; also with a series of holes for fastening the feet upon the ledge already mentioned.

In casting the animal or jerking her upon the table the hobble-ropes of the two outer feet not resting on the table may be passed through one or more staples, K, on the outer edge of the table.

A hinged or swinging frame, L, is arranged to be brought down upon the animal when the two upper feet are lashed to this frame (which has a cushioned edge) by straps in holes *l*, when the frame and feet are drawn up by means of pulley-rope M, which may be conveniently fastened by means of links M' of the chain being caught or slipped on a hook, N. In this way the two upper feet and legs of the animal are drawn up out of the way of the operator, as shown in Fig. 3. In this position the surgeon can conveniently operate upon the animal without stooping, and the animal is held still, so that the surgeon's knife is not liable to make any improper stroke. This table is especially adapted to holding heifers for the operation of vaccination.

I am aware that different forms of animal-stocks have been constructed for confining and holding animals for surgical operations; therefore I confine my claims to my construction of veterinary operating-table as above described.

Having thus described my invention, what I claim is—

1. The above-described table C, hinged at or near its longitudinal axis, whereby it may be easily tilted to the vertical and then to the horizontal position, and provided with means for lashing the heifer animal thereto while she is in a standing position, substantially in the manner and for the purpose set forth.

2. The hinged frame L, in combination with the tilting table C, arranged to be operated substantially as and for the purposes set forth.

In testimony whereof I affix my signature in presence of three witnesses.

JACOB L. SUESSEROTT.

Witnesses:
JOHN L. BLACK,
B. L. KEPLER,
D. K. WUNDERLICH.